United States Patent [19]
Craig

[11] Patent Number: 6,011,932
[45] Date of Patent: Jan. 4, 2000

[54] SPECIALTY CAMERA

[75] Inventor: Robert L. Craig, Winston-Salem, N.C.

[73] Assignee: Creative Camera Concepts, Inc., Plafftown, N.C.

[21] Appl. No.: 09/062,468

[22] Filed: Apr. 17, 1998

Related U.S. Application Data

[60] Provisional application No. 60/068,990, Dec. 29, 1997.
[51] Int. Cl.[7] .................................................. G03B 17/24
[52] U.S. Cl. ............................................ 396/433; 396/535
[58] Field of Search ................................ 396/6, 535, 536, 396/411, 433

[56] References Cited

U.S. PATENT DOCUMENTS

| | | |
|---|---|---|
| D. 389,848 | 1/1998 | James . |
| 3,416,424 | 12/1968 | Harvey ...................................... 396/411 |
| 3,659,798 | 5/1972 | Mindler et al. .......................... 396/411 |
| 3,661,339 | 5/1972 | Shimuzu .................................. 396/411 |
| 4,907,022 | 3/1990 | Myers . |
| 4,947,197 | 8/1990 | Smart et al. . |
| 5,115,264 | 5/1992 | Schappler . |
| 5,239,324 | 8/1993 | Ohmura et al. .......................... 396/411 |
| 5,250,973 | 10/1993 | Pijlman . |
| 5,555,056 | 9/1996 | Schelling et al. . |
| 5,754,909 | 5/1998 | Kotani et al. ............................ 396/536 |

OTHER PUBLICATIONS

Reprint—Potentials in Marketing, 1993 and 4 photographs believed to show custom–shaped car camera shown in upper left hand drawing.

*Primary Examiner*—David M. Gray
*Attorney, Agent, or Firm*—Robert W. Pitts

[57] ABSTRACT

A camera in the shape of an automobile includes a rear face that is substantially identical to a camera and a front shaped like an automobile body. The camera body includes a lens, a viewfinder, a film cannister compartment and a take-up spool compartment. One front wheel rotates relative to the automobile body and serves as a rewind member. In order to position the front wheel at the proper position on the automobile body, a gear mechanism is provided between the rewind wheel and the take-up spool shaft. The automobile body extends beyond the front of the camera body forming an opening in which a carry strap is mounted. The latch actuator for the rear cover is located on the bottom of the camera where it does not interfere with the automobile shape. A rear spoiler extends upward to serve as a finger grip and a push button located at the gas cap serves as a shutter actuator.

4 Claims, 6 Drawing Sheets

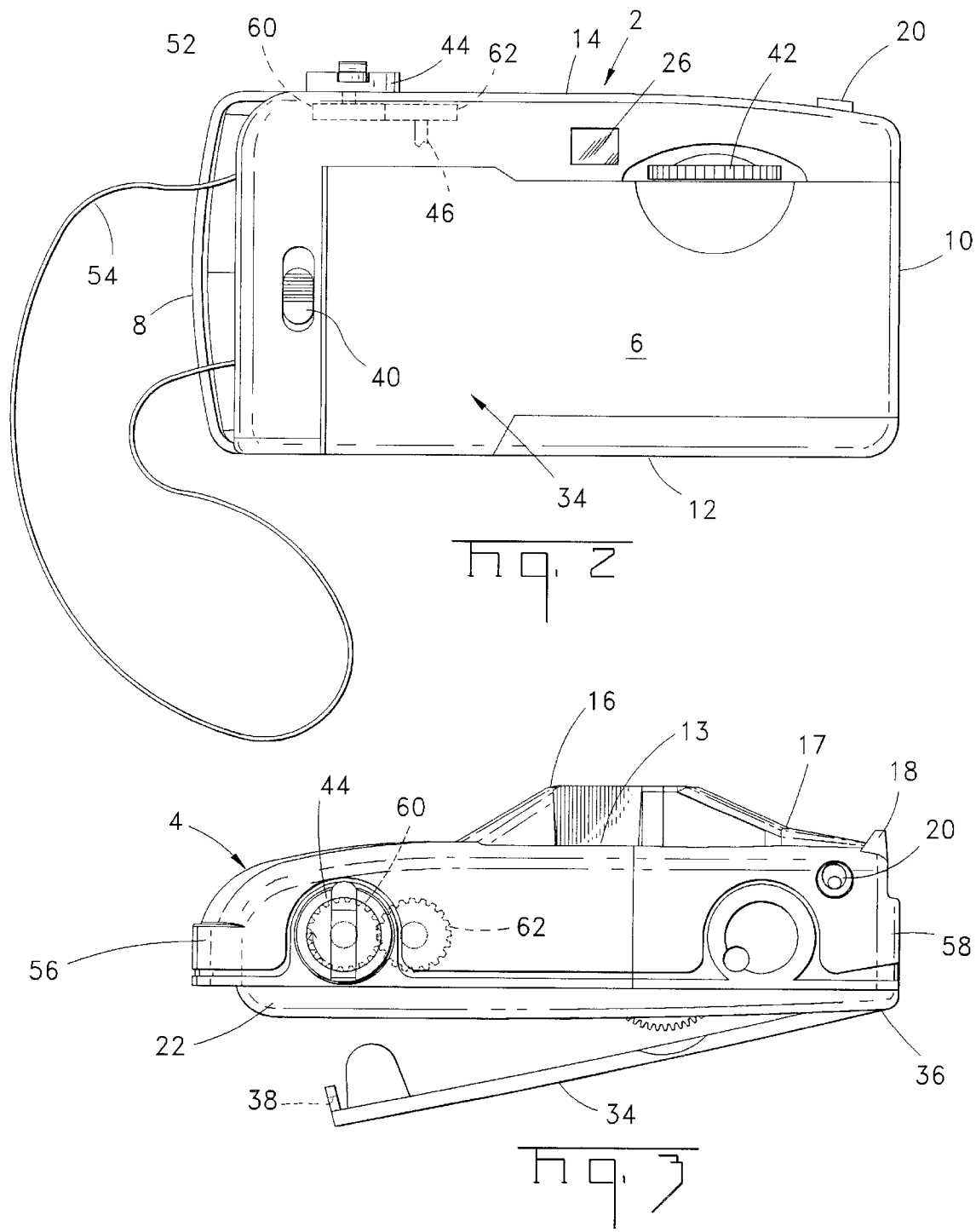

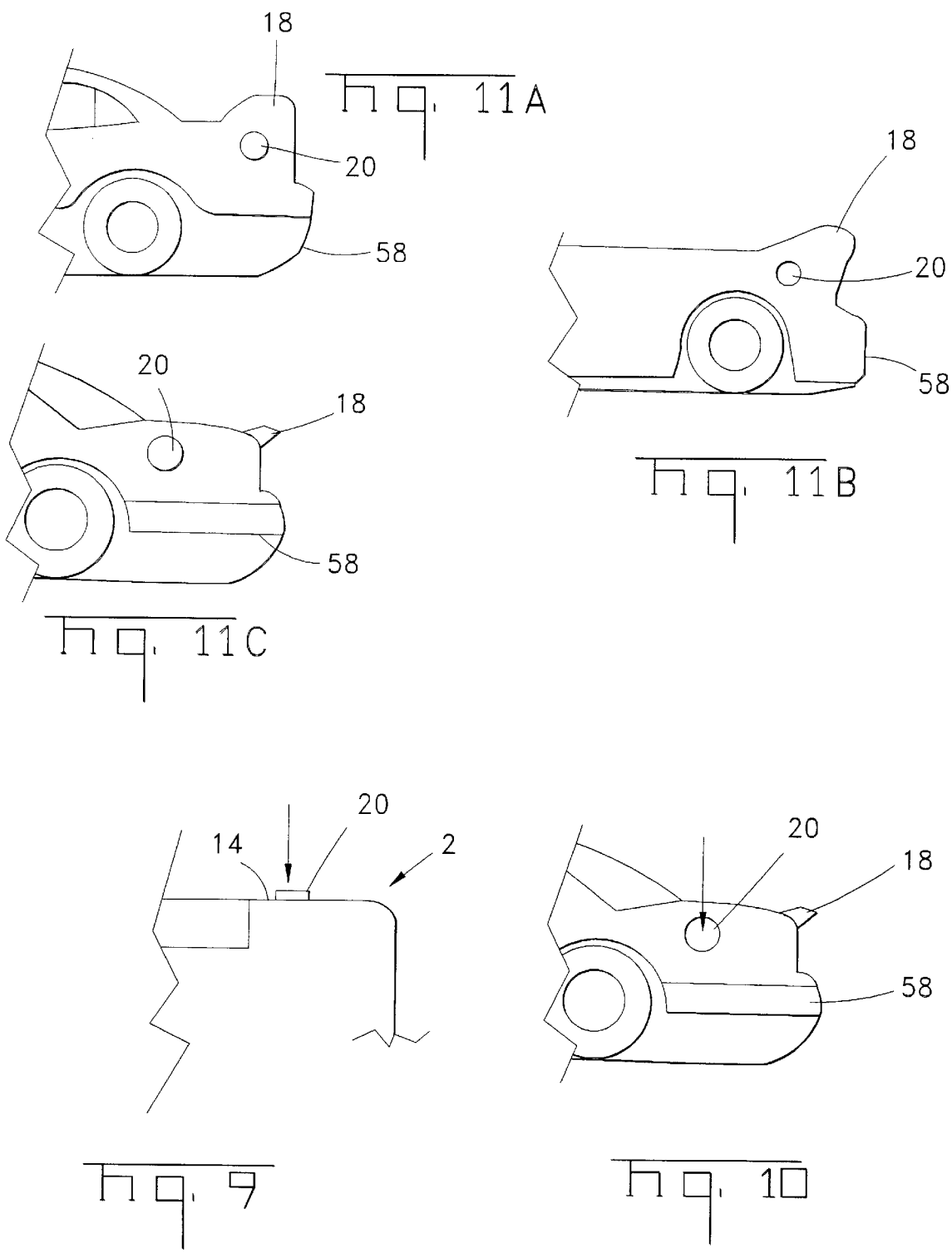

SPECIALTY CAMERA

CROSS REFERENCE TO PENDING PROVISIONAL APPLICATION

This application claims the benefit of Provisional Application 60/068,990 filed Dec. 29, 1997 entitled Speciality Camera.

BACKGROUND OF THE INVENTION

1. Field of the Invention

This invention is related to cameras having an appearance that differs from conventional camera for use as promotional items, souvenirs, sports paraphernalia, or replicas of objects other than cameras. More specifically this invention is related to the use of decorative components of these speciality camera as function elements of the camera. For example, this invention is related to reusable cameras in the shape of automobiles in which wheels or other components of the replica automobile are employed to actuate and manipulate the camera.

2. Description of the Prior Art

Simple direct vision 35 mm cameras comprising a lens, viewfinder, and advance and take-up spools are commonly available and are relatively inexpensive. These cameras are especially suited for the amateur photographer who wishes merely to take snapshots during a vacation or while attending an event, such as a sporting event. These cameras can be sold at sporting events or on vacation cruises. One promotional approach is to provide special packaging related to the event or location so that the camera can be bought as a novelty or souvenir, as well as for taking photographs.

One prior art approach has been to include a molded front cover, which has a distinct appearance. One prior art camera includes a top cover that is molded to resemble a sports car. This front molded cover is shaped to fit over the basic components of a simple camera with openings in the cover for the camera lens and viewfinder. A circular film rewind knob is placed in the general vicinity of one front wheel. One problem with these prior art approaches is that the shape of a scale model automobile may not conform to the physical requirements for the basic camera components. This is especially true because a preexisting camera body would normally be employed because the manufacturing cost to produce special camera components and a special camera body would be prohibitive. Prior art cameras shaped like an automobile have thus required compromises in the shape of the replica automobile in order to conform to the preexisting camera body. For example, protruding cylindrical surfaces have been required to provide sufficient room for a take-up spool compartment on one end of the camera. The height of the replica automobile may also be excessive so that the shape does not conform to a scale model automobile. It may also be necessary for the latch for the rear cover to be positioned so that the latch actuator on one of the scale model surfaces instead of on the rear cover in order to attain a more realistic shape, but the exposed latch actuator also distracts from the appearance of the replica automobile. In some cases, the rewind knob may be located in the general vicinity of the front wheel to enhance the resemblance of the camera to a car. However, if the rewind compartment in which the film cannister is located is not at the same position as the wheel, the prior art cameras have been forced to locate the rewind wheel at the longitudinal position occupied by the film cannister in the camera body. This too distracts from the overall appearance of the replica automobile. These compromises can thus lead to a speciality camera in the shape of a car that does not accurately reflect the shape of an automobile. This inaccuracy can be a problem with certain purchasers. For example, racing car fans or sports car afficionados will insist on a shape that corresponds quite closely to the car in which they are interested.

SUMMARY OF THE INVENTION

According to one embodiment of this invention a camera includes a rear camera body including a lens located between a film take-up spool compartment and a cylindrical film cannister compartment defined by an axis of revolution. This camera also includes a film advance member adjacent the film take up spool compartment and a film rewind member comprising a shaft coaxial with the axis of revolution of the film cannister compartment. The camera also includes a front cover attached to the rear camera body and a decorative component attached to the front. The decorative component is attached to the front cover at a position spaced from the axis of revolution of the film cannister compartment. Furthermore the decorative component is movable relative to the front cover. The decorative component is attached to a first gear and the shaft of the film rewind member is attached to a second gear. The first and second gears are mutually engagable, and movement of the first decorative component imparts rotation to the shaft of the film rewind member to rewind film in the camera.

According to another aspect of this invention, a decorative camera includes a camera body with a lens. Film is positioned in the camera body so that frames to be exposed are aligned with the lens and the film strip can be advanced and rewound. A rear cover on the camera body is shiftable between an open and closed position. A latch for securing the rear cover in the closed position includes an actuator exposed on a bottom surface of the camera body between the rear cover an a front edge of the camera body. A decorative front cover is attached to the camera body. The decorative cover has a length greater than the length of the camera body and protrudes beyond the front edge of the camera body.

A replica scale model automobile including a camera comprises another aspect of this invention. The replica automobile has a bottom surface in the shape of a rear face of a camera and top, side, front and rear faces in the shape of an automobile. The camera includes a lens and a viewfinder with aligned openings for the lens and viewfinder in a raised passenger compartment of the replica automobile. The top face of the replica automobile includes a sloping surface extending toward the rear of the replica automobile and provides space for a film take up compartment in the camera adjacent the rear face of the of the replica automobile. The replica automobile also includes a replica spoiler extending upwardly from the sloping surface adjacent to the rear face of the replica automobile. The replica spoiler has a height sufficient for gripping by an operator's fingers when operating the camera, and a replica fuel tank opening adjacent the replica spoiler is inwardly shiftable to engage a shutter release mechanism in the camera to expose a frame on film held in the camera.

A fourth aspect of this invention comprises a camera having an upper surface, a lower surface, side surfaces and end surfaces. The lower surface has the appearance of a rear face of a camera. The upper surface includes features forming a replica of an object other than a camera. The upper surface includes a first decorative component adjacent a first end of the camera. The first decorative component extends above adjacent portions of the upper surface by a height sufficient to form a finger grip adjacent the first end for a camera operator. A first side surface includes a protruding actuator for releasing a camera shutter. The protruding operator is positioned relative to the first decorative component so that the camera operator can operate the protruding actuator with the operators finger. A second decorative component extends from the first side surface adjacent a second end surface. The second decorative component is rotatable in conjunction with a camera rewind spool to rewind film after exposure.

BRIEF DESCRIPTION OF THE DRAWINGS

FIG. 2 is a view of the bottom or lower surface of the speciality camera as presented to the camera operator showing the conventional functional appearance of this surface speciality camera.

FIG. 3 is a side view of the speciality camera showing the manner in which the rear camera cover opens for access to the interior of the camera.

FIG. 9 is a view showing the shutter release button in the shape of a replica gas cap protruding from the side of the replica automobile.

FIG. 10 is a view showing the position of a replica gas cap on the side of an embodiment of the replica automobile and the position of this gas cap/shutter release button relative to a replica spoiler that can be used as a finger grip by an operator.

FIG. 11A, 11B, and 11C show alternate configurations of decorative spoiler components that can be employed as finger grips.

DETAILED DESCRIPTION OF THE PREFERRED EMBODIMENT

Figure 1:
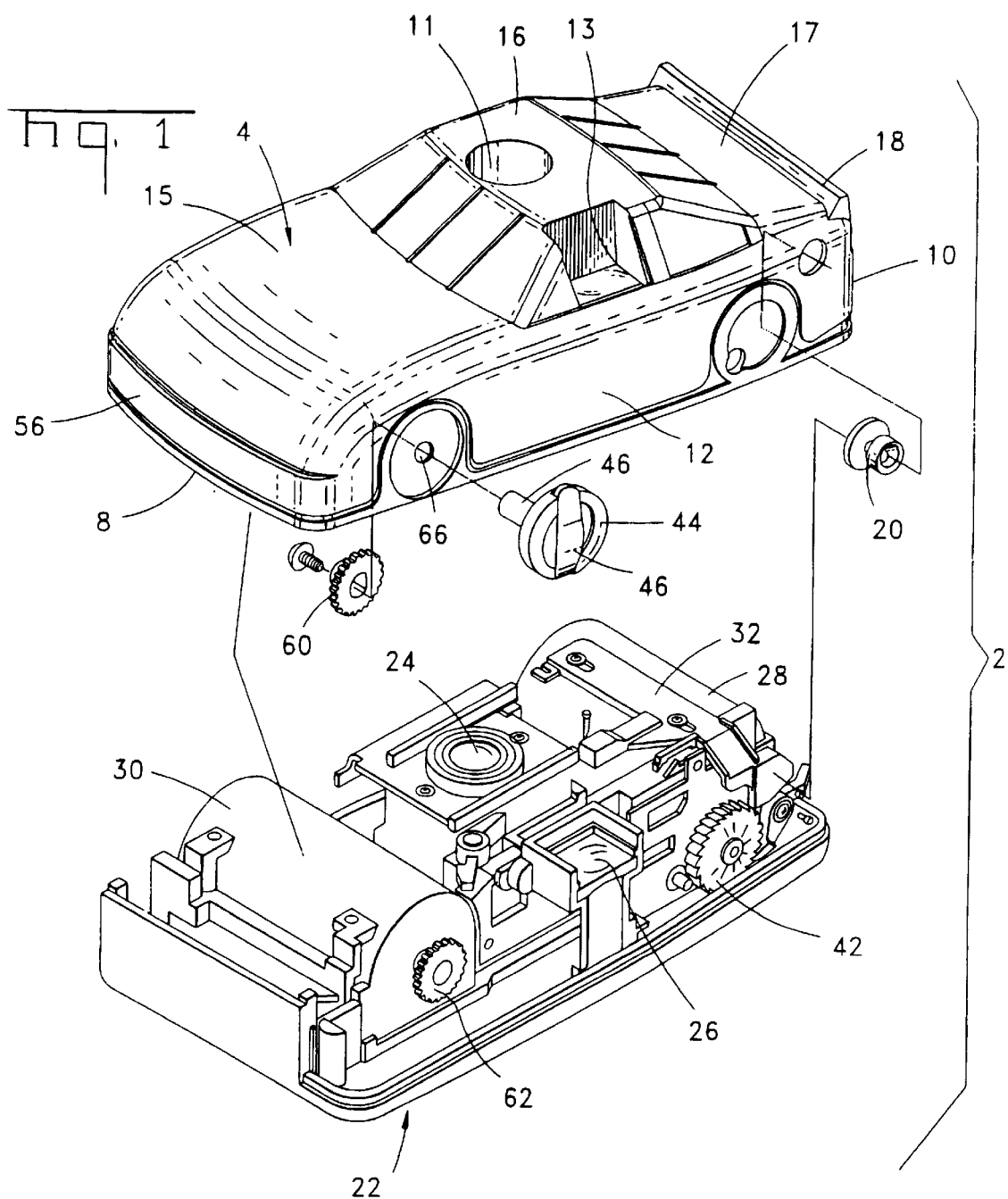
FIG. 1 is an exploded perspective view showing a front cover in the shape of an automobile and a reusable camera body to which the front cover and other decorative components are assembled.

A preferred embodiment of a speciality camera 2 is shown in FIGS. 1–3. This speciality camera 2 has a top front cover 4 in the shape of a scale model replica automobile and a camera body 22 having a bottom surface 6 having a shape substantially the same as a conventional camera. This bottom surface 6 faces the camera operator who will then operate the camera in the same manner as he would operate a standard direct vision camera. This camera 2 having an exposed surfaces with the appearance of a replica automobile can thus be used as a novelty item, a promotional item, a promotional item or as a sports paraphernalia item.

In the preferred embodiment the front cover 4 is molded from a conventional plastic and has a top side 5, a front side 8, a rear side 10, a driver side 12 and a passenger side 12. This front of top cover 4 comprises a thin plastic shell that is open on the lower surface to provide interior space for receipt of the camera body 22. The front cover 4 is in the shape of the visible parts of a car and the top side 5 includes a hood section 15 located on the front of the car with a raised passenger compartment 16 located in the center of the front or top cover 4. A sloping rear deck 17 extends from the raised passenger compartment 16 to a replica rear spoiler 18 located at the intersection of the rear side 10 and the top side 5 of the cover. The sloping rear deck 17 is inclined toward the spoiler 18, which extends above the inclined rear deck 17, and which has a flat surface on the rear of the spoiler 17 that is flush with the rear side 10. This flat surface simplifies molding of the front cover 4. The front cover 4 has a circular lens opening 11 in the roof section of the raised passenger compartment 16. A viewfinder opening 13 is located in the space normally occupied by the driver's side window in the replica automobile, and this cutout viewfinder opening 13 enhances the visual similarity between this scale model replica automobile and a stock racing car. A replica fuel tank or gas cap 20 protrudes from the driver's side 12 adjacent the spoiler 18. The height of the spoiler 18 is sufficient to act as a finger grip and the position of the fuel tank opening 20 relative to the spoiler is such that an operator can engage the fuel tank opening 20 with a thumb so that the fuel tank opening 20 can function as a shutter release actuator or button.

The camera body 22 comprises a generally conventional functional direct vision camera body with certain modifications to be subsequently discussed. Camera body 22 includes a conventional lens 24 and viewfinder 26 both of which are located in the center of the camera body 22. A conventional film take-up spool compartment 28 which stores that portion of a film strip having frames that have been exposed is located adjacent the rear of the camera body 22. A cylindrical film cannister compartment 30, which houses a supply of film located in a conventional cannister or can is located adjacent the front of the camera body 22. A strip of film is advanced from the film cannister compartment 30 along the rear or bottom side of the camera body 22 past the lens 24 to the film take-up spool compartment 28 in a conventional manner. The camera body 22 includes a film advance member 42 in the form of a rotatable disk having a ratchet shaped outer rim. Rotation of this film advance member 42 causes rotation of the sprocket wheel 25 and the take-up spool 27 which advances the film in a conventional manner. Rotation of the film advance member 42 also cocks the shutter in a conventional manner, and when the shutter actuation arm 32 is pushed laterally relative to the camera body releases the shutter to expose a frame of the film in a conventional manner.

The camera body 22 also includes a rear cover 34 which pivots about a hinge 36 located at the rear of the camera body 22. A latch 38 is located at the front of the camera body 22. This latch includes a hood that engages the hinged rear cover 34 and is manipulated by a latch actuator 32 that is located on the bottom surface of the camera body 22 between the front edge of the hinged rear cover 34 and the front of the camera body 22.

The front cover 4 can be attached to the rear camera body 22 with conventional fasteners, such as screws located around the edges of the assembly. The front cover 4 in the shape of a scale model replica automobile provides sufficient interior space for the components of the camera body 22. The assembly also includes a film rewind member 44 in the form of a decorative wheel or tire that is located at approximately the same position, relative to the remainder of the top decorative cover 4, that would be occupied by a front wheel on the driver's side of an automobile. The film rewind member 44 thus forms a decorative component that in conjunction with the decorative shape of the top cover 4 enhances the overall appearance of the replica camera. The film rewind member 44 also includes a film rewind lever 48 that is normally folded in position on the wheel, but which can also be extended so that the operator can manually rewind the film into the film cannister or film can.

A front bumper 56 is also formed on the front side 8 of the decorative cover 4. This front bumper 56 extends beyond the front edge of the rear camera body 22, as best shown in FIG. 2. A front opening 52 is thus formed between the front edge of the camera body 22 and the front bumper 56. The front opening faces the rear of the assembly. A carry strap 54, attached to the camera body 22, extends out of this opening 56. By extending the front of the decorative top cover 4 in this manner, the overall shape of the car camera assembly more closely conforms to the shape of a real automobile, such as a stock racing car, while still providing adequate internal space for the camera body 22.

The shutter release button 20, in the shape of a stock car fuel tank opening, is also located on the driver's side in the proper scale location. This fuel tank opening or gas cap 20 is mounted in an opening on the exterior decorative cover 4 and is positioned in alignment with the end of the shutter actuation arm 32. When the fuel tank opening shaped shutter release button 20 is pressed, the shutter actuation arm is moved laterally releasing the shutter in a conventional manner to expose a film frame located in alignment with the lens 24.

In order to achieve the proper scale and appearance, the decorative film rewind member or wheel 44 is located in front of the shaft of the film rewind member. The shaft of the film rewind member extends through a hole in the side of the film cannister compartment 30 and a gear 60 is located on the outer side of this compartment 30. The film rewind member 44 has a second gear 62 attached to the inside of the wheel by a screw, not shown. The axle of the wheel shaped film rewind member extends through a hole 66 in the side of the top cover 4. The gear 60 is thus held in position by the camera body 22 and the gear 62 is held in position by the cover 4. When the cover 4 is mounted on the camera body 22, the two gears 60, 62 mesh. When the film rewind wheel 44 is rotated in a counterclockwise direction, film is wound into the film cannister or can located in the cylindrical film cannister compartment 30 in a clockwise direction.

Figure 4A:
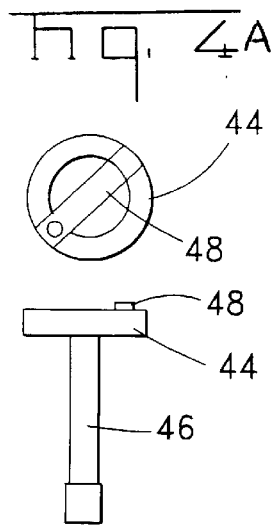
FIGS. 4A, 4B, 4C and 4D show a camera rewind knob in the shape of a wheel or tire and the use of a gear mechanism to extend the position of the camera rewind knob and for transmitting rotation of the camera rewind know to an internal rewind spool located on an axis spaced from the axis of rotation of the camera rewind knob.
Figure 4C:
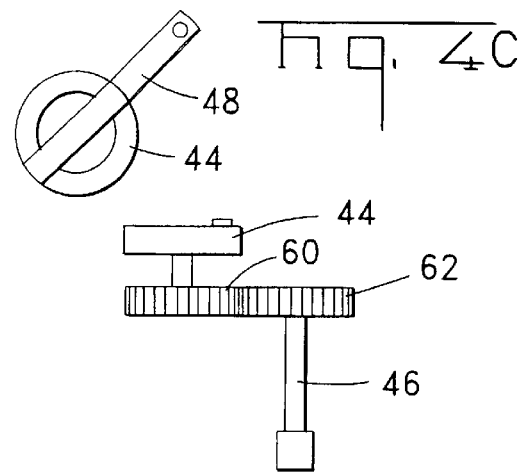
Figure 4B:
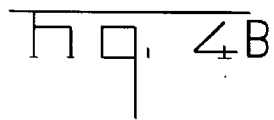
Figure 4D:
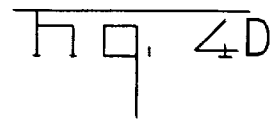
Figure 5A:
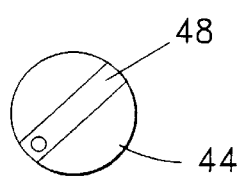
FIGS. 5A, 5B, and 5C are views similar to FIGS. 4 showing the camera rewind knob disguised as a wheel in the form of a solid circular member.
Figure 5B:
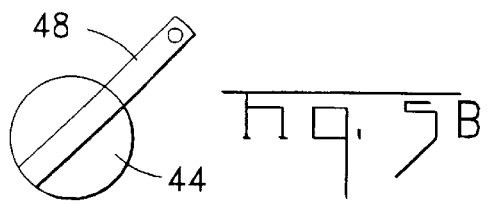
Figure 5C:
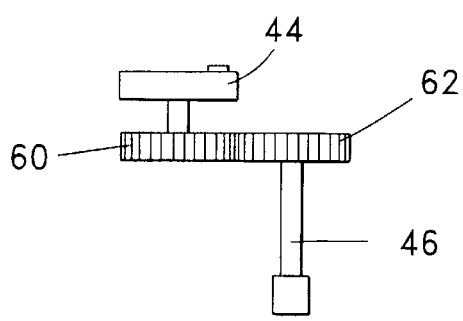

FIGS. 4A–D and 5 A–C illustrate more details of the rewind member disguised as a wheel or tire. FIGS. 4A and 4B show a wheel in which the rewind wheel 44 is on the same centerline as a shaft 46 that engages a standard film cannister or can to rewind a roll of film after exposure of all or a part of the frames. FIGS. 4C and 4D show the offset wheel in which rotation of the rewind wheel 44 is transferred to the shaft 46 through gears 60 and 62. FIG. 4C also shows an extended film rewind lever 48 for manually rewinding the film. FIGS. 5A–C are similar views in which the rewind member is in the form of a solid circular member which can represent a wheel.

Figure 6:
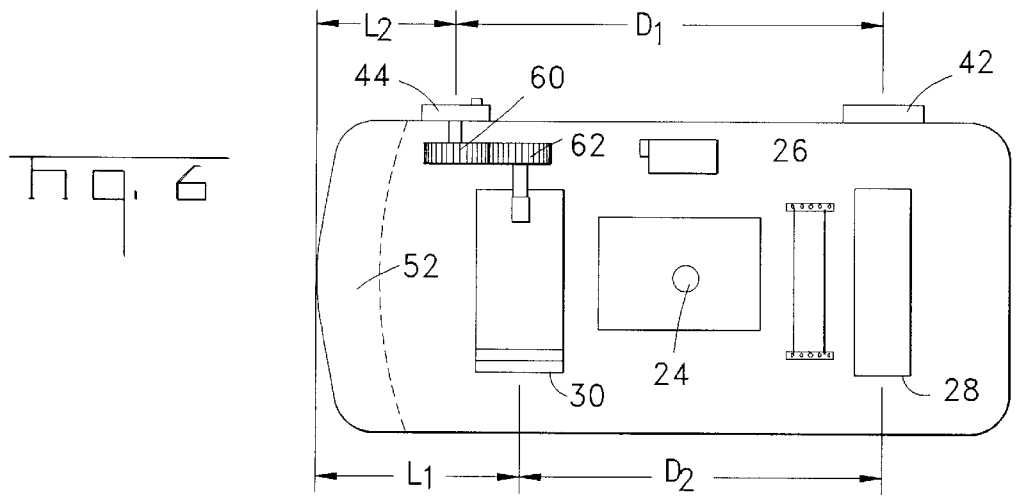
FIG. 6 shows the relative positions of conventional camera components and a rewind knob component that has been repositioned or extended relative to the conventional location of the rewind spool for decorative purposes.
Figure 7:
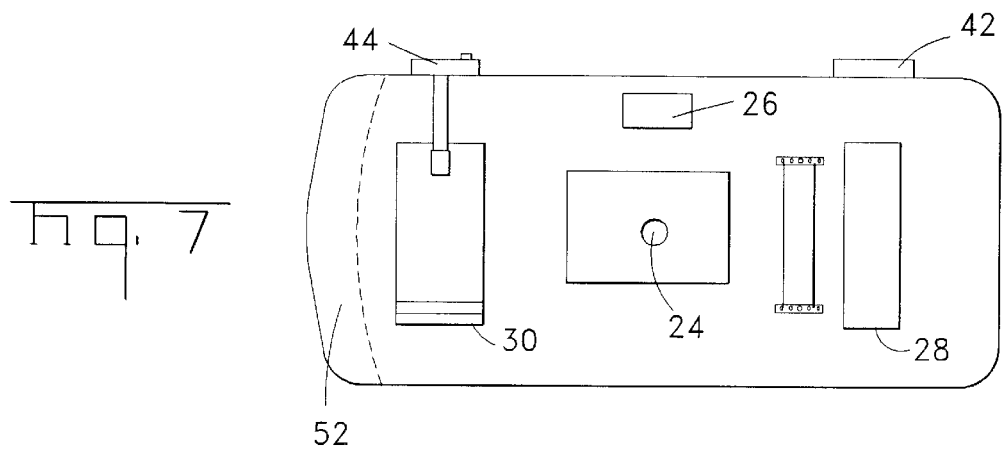
FIG. 7 shows an alternate embodiment in which the entire film chamber has been repositioned relative to a conventional camera so that the rewind spool is located on the same axis as the decorative rewind knob.

FIGS. 6 and 7 show the position of the wheel shaped film rewind member 44 relative to the film cannister compartment 30 in the two different embodiments. FIG. 6 shows the configuration in which the gears 60 and 62 are repositioned so that the wheel shaped rewind member 44 can be located closer to the location of a normal wheel on a replica automobile. Note that the centerline of the film cannister compartment 30 is spaced from the front edge of the assembly by a distance of L1 and the axis of the film rewind member is spaced from the front edge by a distance of L2 and the L1 is greater than L2. FIG. 6 also shows that the wheel base of the replica automobile, equal to the spacing between the film rewind member 44 and a film advance member 42, both having protruding circular shapes to represent wheel, is equal to a distance of D1. The distance between the centerlines of the film take-up spool compartment 28 and the film cannister compartment 30 is equal to D2. An accurate representation of a replica automobile when compared to a conventional camera body will require D1 to be greater than D2. FIG. 7 shows the relative configuration of the components when the film cannister compartment 30 and the wheel shaped film rewind member 44 are both repositioned so that the aligned front wheel would be a more accurate representation of an automobile. Note that this alternate embodiment of FIG. 7 would require a unconventional location of the components of a camera body. In this configuration, the film cannister compartment 30 is closer to the front end of the camera body than to the lens 24.

Figure 8:
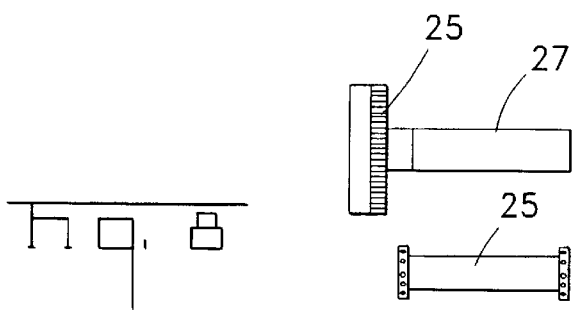
FIG. 8 is a view showing the relative position of a film advance and shutter cock member of conventional construction employed in the camera body and a replica gas cap that can be used as a shutter actuator or shutter release button.

FIG. 8 is a view showing the relative position of a film advance and shutter cock member of conventional construction employed in the camera body and a replica gas cap that can be used as a shutter actuator or shutter release button.

FIGS. 9 and 10 is a view of a alternate automobile replica showing the position of a protruding gas gap which functions as a shutter release button 20 relative to a raised spoiler 18 that can function as a finger or hand grip for the camera operator. FIGS. 11A–C show various shapes that can be used as the spoiler-hand grip.

Figure 12:
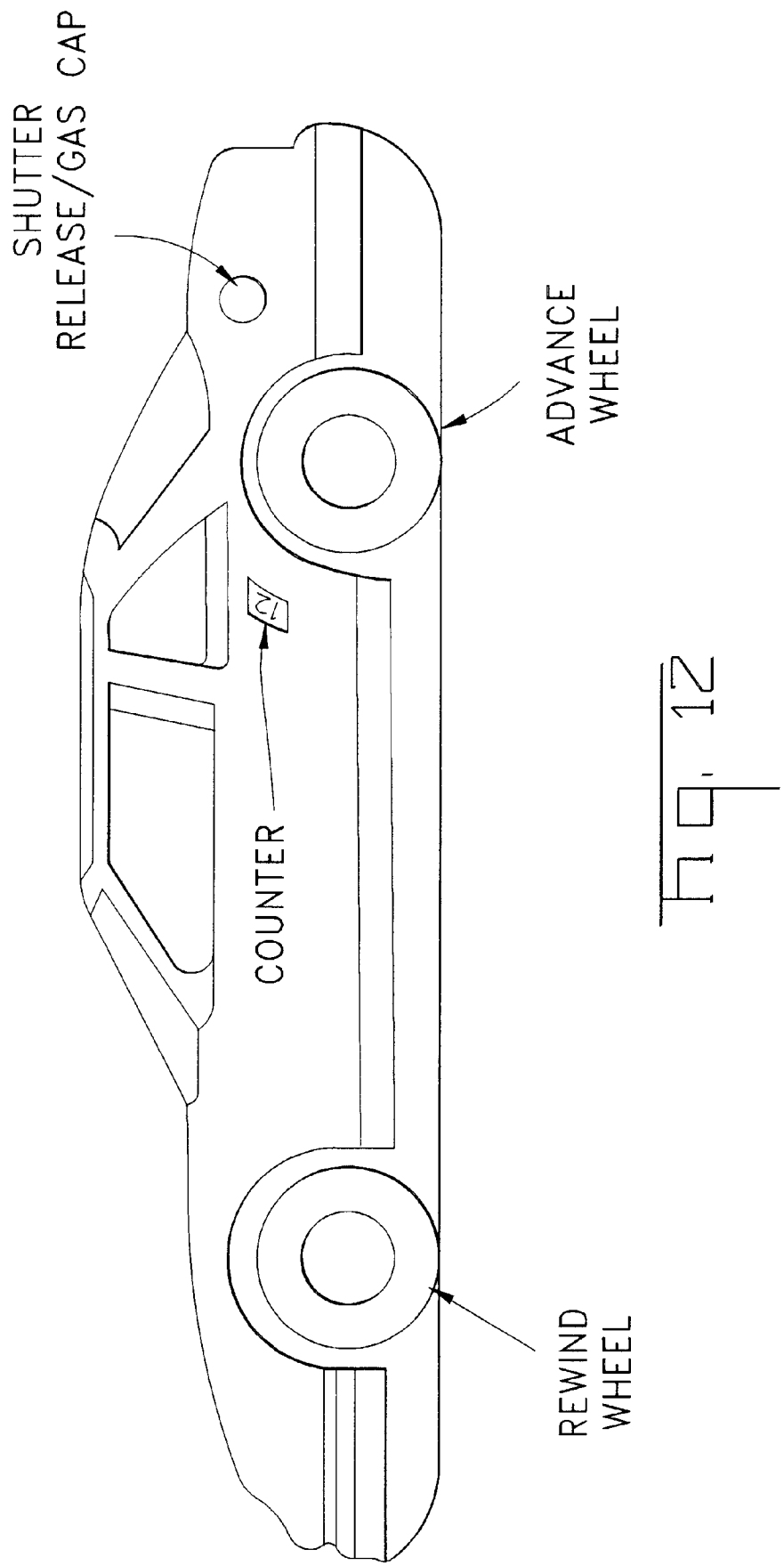
FIG. 12 is a side view of an alternative embodiment of an automobile shaped camera.

FIG. 12 is a view of an alternate embodiment of a camera shaped like an automobile in which one possible location of a frame counter adjacent the advance wheel is shown.

Figure 13A:
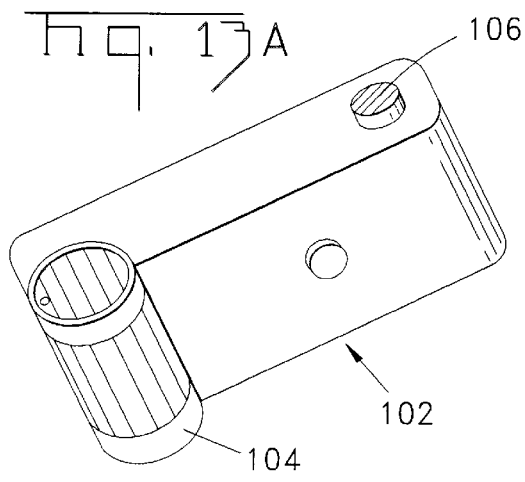
FIGS. 13A and 13B are views of an alternate embodiment of a speciality camera in which a protruding barrel is employed as a finger grip on the camera.
Figure 13B:
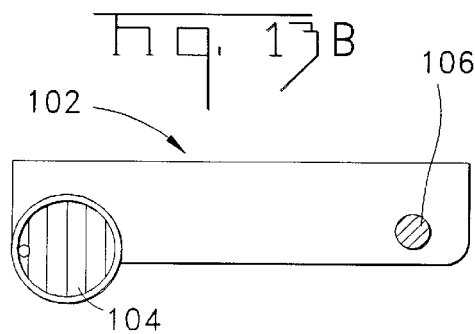

FIGS. 13A and B illustrate that the basic elements of replica cameras are not limited to automobile shapes. In this camera 102 a raised rear surface 104 in the form of a barrel provides both space for a film take up spool and a finger or hand grip, and the film rewind member 106 can also be shaped as the end of a circular barrel.

Of course it should be understood that the embodiments of this invention are representative only. Other shapes, such as a truck or a ship could be employed. Mechanical modifications would also be apparent to one of ordinary skill in the art. For example, a pulley mechanism or other force transfer mechanism could be substituted for the rewind gears. Therefore this invention is defined by the following claims.

I claim:

1. A decorative, manually operated, camera comprising:
 a camera body including a lens and means for positioning and reeling film in the camera body;
 a rear cover on the camera body, the rear cover being shiftable between an open and closed position;

a latch for securing the rear cover in the closed position, the latch including an actuator exposed on a rear surface of the camera body between the rear cover and an adjacent edge of the camera body; and a decorative front cover attached to the camera body, the decorative cover having a length greater than the length of the camera body and protruding beyond said adjacent edge of the camera body to provide space for attachment of a carry strap wherein the decorative front cover conforms to the shape of an automobile having a front bumper section, the front bumper section of the automobile extending beyond said adjacent edge of the camera body.

2. The decorative camera of claim 1 wherein the front bumper section of the decorative cover is spaced from said adjacent edge of the camera body forming an opening between said adjacent edge of the camera body and the dcorative cover, the opening being located on a rear surface of the camera.

3. The decorative camera of claim 2 wherein the camera includes a carry strap attached to the camera body and extending from the opening between the front bumper section of the decorative cover and said adjacent edge of the camera body.

4. The decorative camera of claim 1 wherein the camera body includes means for reeling the film about a front axis adjacent the front edge of the camera body and a rotatable wheel located adjacent the front side of the decorative front cover, the rotatable wheel being longitudinally spaced from the front axis and means for transmitting rotation of the front wheel to the means for reeling the film about the front axis.

\* \* \* \* \*